US012569390B2

(12) United States Patent
Pierce, Jr. et al.

(10) Patent No.: US 12,569,390 B2
(45) **Date of Patent: *Mar. 10, 2026**

(54) PERCUSSIVE ADJUSTING INSTRUMENT

(71) Applicant: J&S ASSOCIATES, LLC, Sheridan, WY (US)

(72) Inventors: George Stanford Pierce, Jr., Clearwater, FL (US); Kelcey Lynn Wiginton, Dallas, TX (US); Jason Jon Bagnall, New Baltimore, MI (US); Chad Matthew Edens, Clay, MI (US)

(73) Assignee: J&S ASSOCIATES, LLC, Sheridan, WY (US)

( * ) Notice: Subject to any disclaimer, the term of this patent is extended or adjusted under 35 U.S.C. 154(b) by 1299 days.

This patent is subject to a terminal disclaimer.

(21) Appl. No.: 17/201,831

(22) Filed: Mar. 15, 2021

(65) Prior Publication Data

US 2021/0196553 A1 Jul. 1, 2021

Related U.S. Application Data

(63) Continuation of application No. 16/009,632, filed on Jun. 15, 2018, now Pat. No. 10,945,906.

(Continued)

(51) Int. Cl.

*A61H 1/00* (2006.01)
*A61G 13/00* (2006.01)

(Continued)

(52) U.S. Cl.

CPC ........... *A61H 1/008* (2013.01); *A61G 13/009* (2013.01); *A61G 13/10* (2013.01); *A61G 13/121* (2013.01);

(Continued)

(58) Field of Classification Search

CPC .......... A61H 1/00; A61H 1/005; A61H 1/006; A61H 1/008; A61H 1/0222; A61H 1/0218; A61H 1/0292; A61H 1/0296; A61H 23/00; A61H 23/006; A61H 23/04; A61H 23/008; A61H 39/00; A61H 39/007; A61H 39/04; A61H 99/00; A61H 2203/0443; A61H 2203/0475; A61H 2205/04; A61H 2201/01; A61H 2201/0119; A61H 2201/0138; A61H 2201/0142; A61H 2201/0149; A61H 2201/1609; A61H 2201/1676; A61H 2201/0192; A61H 2201/1664;

(Continued)

(56) References Cited

U.S. PATENT DOCUMENTS 4,041,938 A * 8/1977 Wintoniw .............. A61H 7/004 601/111
4,243,025 A * 1/1981 Jones ..................... A61H 1/008 297/409

(Continued)

*Primary Examiner* — Colin W Stuart
(74) *Attorney, Agent, or Firm* — Barnes & Thornburg LLP

(57) ABSTRACT

A percussive adjusting instrument is provided which includes a percussive instrument head and a traversing arm that couples to the percussive instrument head. The percussive instrument head is movable with respect to the traversing arm. A vertical arm supports the traversing arm. The vertical arm also pivots the traversing arm and the percussive instrument head about an axis. A pivot assembly allows movement of the vertical arm and the percussive instrument head.

14 Claims, 13 Drawing Sheets

Related U.S. Application Data

(60) Provisional application No. 62/520,672, filed on Jun. 16, 2017.

(51) Int. Cl.
*A61G 13/10* (2006.01)
*A61G 13/12* (2006.01)
*A61H 23/00* (2006.01)

(52) U.S. Cl.
CPC ........... *A61H 23/00* (2013.01); *A61H 23/004* (2013.01); *A61H 23/006* (2013.01); *A61G 2210/00* (2013.01); *A61H 2201/0138* (2013.01); *A61H 2201/0142* (2013.01); *A61H 2201/0192* (2013.01); *A61H 2201/1207* (2013.01); *A61H 2201/1604* (2013.01); *A61H 2201/1664* (2013.01); *A61H 2201/1676* (2013.01); *A61H 2201/5007* (2013.01); *A61H 2201/5043* (2013.01); *A61H 2201/5069* (2013.01); *A61H 2201/5092* (2013.01); *A61H 2201/5097* (2013.01); *A61H 2203/0475* (2013.01)

(58) Field of Classification Search
CPC ...... A61G 13/00; A61G 13/009; A61G 13/02; A61G 13/10; A61G 13/121
See application file for complete search history.

(56) References Cited

U.S. PATENT DOCUMENTS

| | | | | |
|---|---|---|---|---|
| 4,984,568 A * | 1/1991 | Persaud | A61H 7/008 | 601/126 |
| 6,585,668 B2 * | 7/2003 | Nissim | A61H 7/001 | 601/134 |
| 8,152,747 B2 * | 4/2012 | Khan | A61H 1/008 | 601/48 |
| 8,845,561 B2 * | 9/2014 | Khan | A61H 1/008 | 601/48 |
| 10,945,906 B2 * | 3/2021 | Pierce, Jr. | A61G 13/009 | |
| 2004/0193077 A1 * | 9/2004 | Hsu | A61H 9/0071 | 601/103 |
| 2013/0184618 A1 * | 7/2013 | Woerlee | A61H 31/006 | 601/41 |
| 2016/0367425 A1 * | 12/2016 | Wersland | A61H 1/008 | |

* cited by examiner

PERCUSSIVE ADJUSTING INSTRUMENT

RELATED APPLICATION

The present application is a Continuation application that is related to and claims priority to U.S. Pat. No. 10,945,906, entitled "PERCUSSIVE ADJUSTING INSTRUMENT," filed on Jun. 15, 2018, and related to and claims priority to U.S. Provisional Patent Application Ser. No. 62/520,672, entitled, "THREE AXES PERCUSSIVE ADJUSTING INSTRUMENT," filed on Jun. 16, 2017. To the extent not included below, the subject matter disclosed in this application is hereby expressly incorporated into the present Application by reference.

TECHNICAL FIELD AND SUMMARY

The present disclosure relates to percussive adjusting instruments used in the chiropractic treatment of patients, and particularly, to a percussive adjusting instrument that includes a pivotable vertical lift arm and other improvements.

Percussive adjusting instruments are known in the chiropractic field. Traditionally, x-rays are taken of a patient's spine to determine if any of the vertebrae are misaligned. These measurements are taken around the X, Y, and Z axes of the patient as defined by the Cartesian coordinate system such as that demonstrably shown in FIG. 2. Adjustments are then made along the Y and Z axes as demonstrably shown in FIG. 3, based on x-rays and extrapolated calculations using various average characteristics of people. Specifically, a percussion generated soundwave is generated from the percussive adjusting instrument to help realign the vertebrae using the calculations. Extrapolated calculations are used because a conventional percussive adjusting instrument does not actually move around the Y-axis (as shown in FIG. 3) of a person. Such instruments are limited to pivoting movement about only the X-axis and some limited movement relative to the Z-axis.

Accordingly, an illustrative embodiment of the present disclosure in one form provides a percussive adjusting instrument that is movable in the Y-axis. Another illustrative embodiment of the present disclosure in one form provides a three axes percussive adjusting instrument that is not only movable about X and Z axes, but also movable about the Y-axis as well. This allows measurements to be taken from an x-ray and precise adjustments made along the patient's Y-axis using the percussive soundwave. Such movement about the Y-axis by the percussive adjusting instrument allows more precise adjustments to the patient.

Another illustrative embodiment of the present disclosure provides a percussive adjusting instrument. The percussive adjusting instrument comprises a percussive instrument head that includes a percussive instrument stylus extending from the instrument head; a table that supports a patient; wherein the percussive instrument head is movable relative to the table about X-axis, Y-axis, and Z-axis of a Cartesian coordinate system; a Z-axis bracket which supports the percussive instrument head to allow selective movement about the Z-axis; a traversing arm that couples to the Z-axis bracket; a vertical lift arm assembly that includes: a vertical ram arm that supports the traversing arm; a traversing bracket that holds the traversing arm to the vertical ram arm and allows selective movement of the traversing arm with respect to the vertical ram arm; an instrument lift actuator coupled to the vertical ram arm to move the vertical ram arm in vertical directions; a Y-axis pivot assembly that allows movement of the vertical lift arm assembly and the instrument head about the Y-axis; wherein the Y-axis pivot assembly includes: a central gear; at least one Y-axis pivot control knob connected to the central gear; wherein rotation of the at least one Y-axis pivot control knob rotates the central gear; a pivot gear located on the vertical ram arm assembly; wherein rotation of the Y-axis pivot control knob rotates the central gear which engages the pivot gear which moves the vertical lift arm assembly about the Y-axis; a Y-axis pivot lift actuator that selectively moves the Y-axis pivot assembly to move the vertical lift arm assembly and the instrument head in vertical directions; a headpiece that is movable with respect to the table; a connecting arm attached to the Y-axis pivot assembly and movably attached to the table; and a pivot pin that engages both the connecting arm and the table to allow selective movement of the connecting arm with respect to the table about the X-axis.

In the above and other illustrative embodiments, the percussive adjusting instrument may further comprise: the central gear being a worm screw; the pivot gear being a worm wheel located on a separate axis from the worm screw, wherein the worm wheel is coupled to the vertical lift arm assembly; the worm wheel includes teeth that mesh with corresponding teeth on the worm screw such that movement of the at least one Y-axis pivot control knob moves the worm screw which engages the worm wheel to move the vertical lift arm assembly and the instrument head about the Y-axis; the headpiece includes an inclinometer; the percussive instrument head includes a Z-axis inclinometer; a Y-axis inclinometer; and a Y-axis laser light and a stylus aiming laser light. Additionally, the stylus aiming laser is used for patient positioning on the headpiece.

Another illustrative embodiment of the present disclosure provides a percussive adjusting instrument. The percussive adjusting instrument comprises a percussive instrument head; a traversing arm that couples to the percussive instrument head; wherein the percussive instrument head is movable with respect to the traversing arm; a vertical arm that supports the traversing arm; wherein the vertical arm moves the traversing arm and the percussive instrument head about an axis; a pivot assembly that allows movement of the vertical arm and the percussive instrument head about the axis; wherein the pivot assembly includes: a central gear; and a pivot gear associated with the vertical arm; wherein rotation of the central gear engages the pivot gear which moves the upper vertical arm.

In the above and other illustrative embodiments, the percussive adjusting instrument may further comprise: a table that supports a patient, wherein the percussive instrument head is movable relative to the table about X-axis, Y-axis, and Z-axis of a Cartesian coordinate system; a traversing bracket that holds the traversing arm to the vertical arm to allow selective movement of the traversing arm with respect to the vertical arm; at least one pivot control knob connected to the central gear, wherein rotation of the at least one pivot control knob rotates the central gear, wherein rotation of the pivot control knob rotates the central gear which engages the pivot gear which moves the vertical arm assembly; a connecting arm attached to the pivot assembly and movably attached to a table that supports a patient; the central gear is a worm screw; the pivot gear is a worm wheel located on a separate axis from the worm screw, wherein the worm wheel is coupled to the vertical lift arm; wherein the worm wheel includes teeth that mesh with corresponding teeth on the worm screw such that movement of at least one pivot control knob moves the worm screw which engages the worm wheel to move the vertical lift arm and the instrument head; a stylus aiming laser used to position a patient positioning on a headpiece; and a display screen located adjacent the pivot assembly.

Another illustrative embodiment of the present disclosure provides a percussive adjusting instrument. The percussive adjusting instrument comprises a percussive instrument head movable relative to a structure about X-axis, Y-axis, and Z-axis of a Cartesian coordinate system.

Another illustrative embodiment of the present disclosure provides a percussive adjusting instrument. The percussive adjusting instrument comprises a percussive instrument head; a vertical arm that supports the percussive instrument head; wherein the vertical arm moves the percussive instrument head about an axis; wherein the axis is oriented transverse to a longitudinal extent of the vertical arm when the vertical arm is located in a vertically-oriented position.

Additional features and advantages of the percussive adjustment instrument will become apparent to those skilled in the art upon consideration of the following detailed descriptions exemplifying the best mode of carrying out the percussive adjustment instrument as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
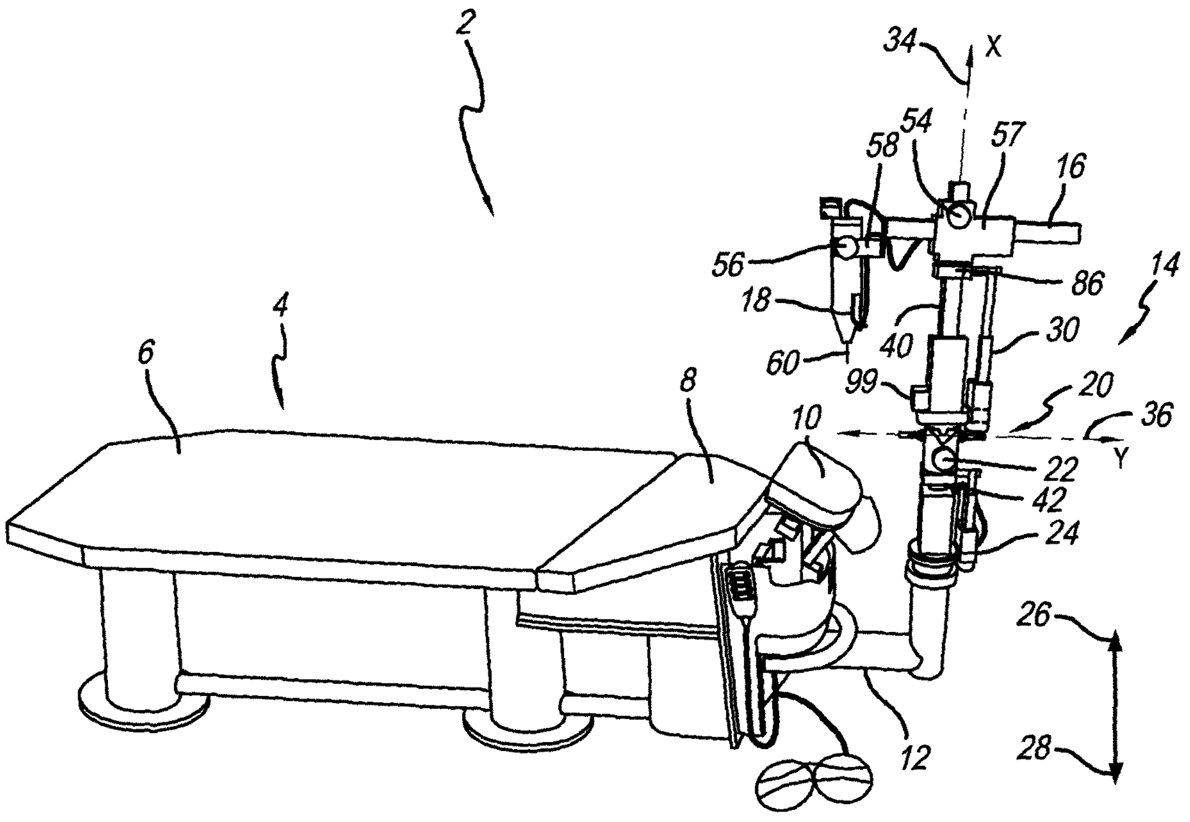
FIG. 1 is a perspective view of a percussive adjusting instrument according to the present disclosure.

Corresponding reference characters indicate corresponding parts throughout the several views. The exemplification set out herein illustrates an embodiment of the percussive adjustment instrument, in one form, and such exemplification is not to be construed as limiting the scope of the percussive adjustment instrument in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure in one form provides a three axes percussive adjusting instrument 2 that is not only movable about X and Z axes, but also movable about the Y-axis as well. This allows measurements to be taken from an x-ray and precise adjustments made along the patient's Y-axis using a percussive soundwave. Such movement about the Y-axis by percussive adjusting instrument 2 allows more precise adjustments to the patient.

A perspective view of an illustrative embodiment of percussive adjusting instrument 2 is shown in FIG. 1. Percussive adjusting instrument 2 includes a table or bed-portion 4 illustratively composed of a primary body support 6, shoulder support 8, and headpiece 10. As shown, a connecting arm 12 located underneath headpiece 10 extends outward to a lift arm assembly 14 that suspends a traversing arm 16 and instrument head 18 above a patient (see FIG. 17). Pivot bracket 58 holds instrument head 18 and is held by traversing arm 16. Lift arm assembly 14 includes a Y-axis pivot assembly 20 that is illustratively movable via a Y-axis pivot control knob 22. A pivot lift actuator 24 is able to raise and lower this portion of lift arm assembly 14 in directions 26 or 28 to desired heights. Similarly, an instrument lift actuator 30 is configured to raise and lower the traversing arm 16 and attached instrument head 18 without moving Y-axis pivot assembly 20. Instrument lift actuator 30 also provides structural support to traversing arm 16 and instrument head 18 while the lift arm assembly 14 is moved about a Y-axis 36 (see also, FIGS. 4, 5, 6). In this way, lift arm assembly 14 may be raised or lowered in directions 26 or 28, respectively, at two locations, one being at vertical arm 42 located below the Y-axis pivot assembly 20 and the other being at vertical ram 40 located above Y-axis pivot assembly 20.

Figure 2:
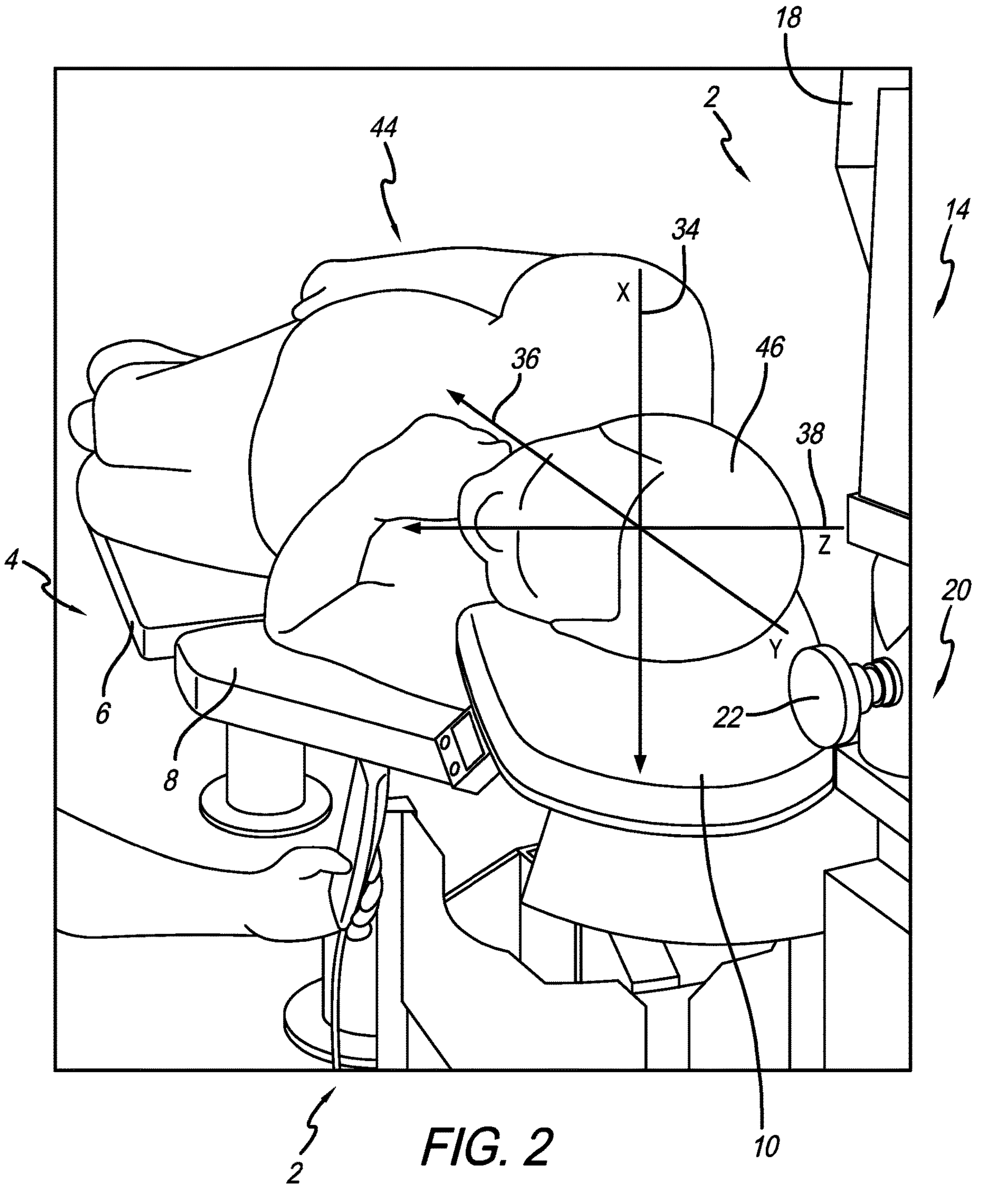
FIG. 2 is a perspective view of a bed portion of the percussive adjusting instrument with a portion of the X-axis, Y-axis, and Z-axis of a Cartesian coordinate system superimposed thereon.

A perspective head view of bed portion 4 of percussive adjusting instrument 2, with a patient 44 lying thereon, is shown in FIG. 2. This view shows X-axis 34, Y-axis 36, and Z-axis 38 from a Cartesian coordinate system oriented with respect to percussive adjusting instrument 2. As shown, X-axis 34 is illustratively the vertical axis that extends from ear to ear of patient 44 while lying on bed portion 4 with head 46 of patient 44 resting on headpiece 10. Also shown illustratively is Z-axis 38 oriented perpendicular to X-axis 34, extending from front to rear of head 46 of patient 44. It is appreciated that prior art adjusting instruments included only a vertical arm that pivoted about the X-axis, as well as an instrument head that pivoted about a Z-axis. These prior art instruments, however, did not pivot about any Y-axis as shown located perpendicular to X and Z-axes.

Figure 3:
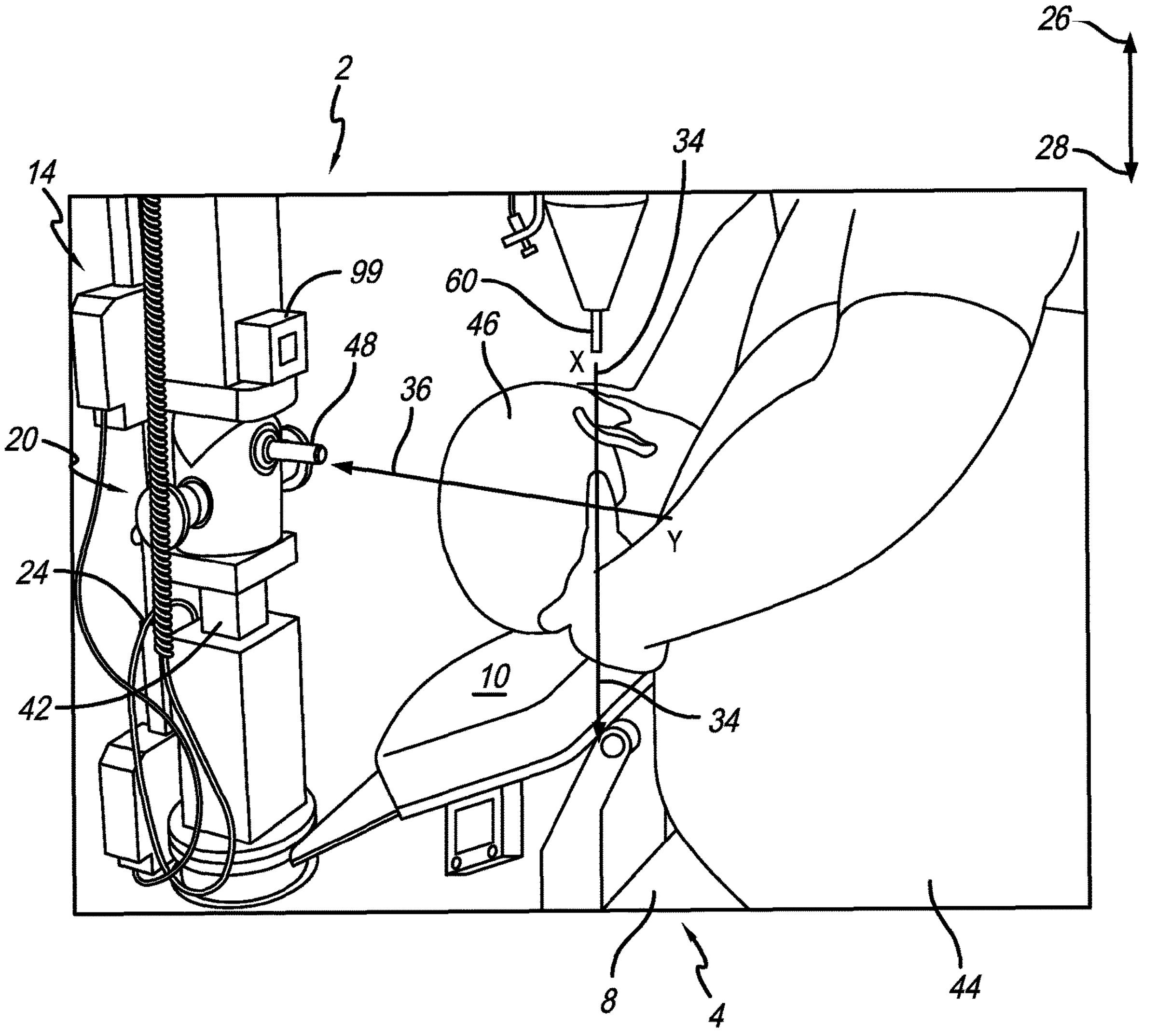
FIG. 3 is a side perspective detail view of the percussive adjusting instrument with X and Y axes of the Cartesian coordinate system superimposed thereon.

A side perspective detail view of bed portion 4 of percussive adjusting instrument 2, with patient 44 lying thereon, is shown in FIG. 3. This view also shows patient 44 lying on shoulder support 8 with head 46 resting on headpiece 10. Here, X and Y axes of the Cartesian coordinate system are oriented with respect to percussive adjusting instrument 2. As illustratively shown, Y-axis 36 extends from Y-axis pivot assembly 20. This view makes clear the orientation of Y-axis 36 which essentially extends through the body of patient 44, and perpendicular to lift arm assembly 14. Vertical ram arm 42, as well as Y-axis pivot assembly 20 and Y-axis laser 48, may be used to align patient 44 with percussive adjusting instrument 2 (see also, FIGS. 14 and 15). Additionally, pivot lift actuator 24 may assist moving lift arm assembly 14 to an appropriate position with respect to patient 44. Particularly, as shown further herein (see e.g., FIGS. 4, 5, and 6), this is the point above which lift arm assembly 14 may pivot about Y-axis 36 to move instrument head 18 about Y-axis 36 with respect to patient 44 as well. It is appreciated that shoulder support 6, headpiece 10, Y pivot assembly, and lift arm assembly 14, including vertical ram arm 40, and vertical arm 42, may be moved along X-axis 34 in directions 26 and 28 (see also, FIG. 1) to obtain the appropriate vertical alignment of instrument head 18, relative to patient 44.

Further, a lift actuator (not shown) may be attached to headpiece 10 to move headpiece 10 vertically along an x-axis in directions 26 and 28. A controller (not shown) may cause both the lift actuator of headpiece 10 and pivot lift actuator 24 to move in concert in directions 26 and 28. This is so Y-axis pivot assembly 20 will move with the head of patient 44. That said, pivot lift actuator 24 may then move in directions 26 and 28 independently from headpiece 10 so as to fine tune positioning of Y-axis pivot assembly 20 with respect to patient 44.

It is appreciated that this coordinate system illustratively arranges the Y-axis horizontally. This is because, as the skilled artisan will appreciate, a patient is x-rayed while standing, i.e., the Y-axis is oriented vertically from head-to-toe. But when receiving treatment, the patient will be lying down so here the Y-axis 36, although oriented horizontally, is still extending through the patient from head-to-toe.

Figure 4:
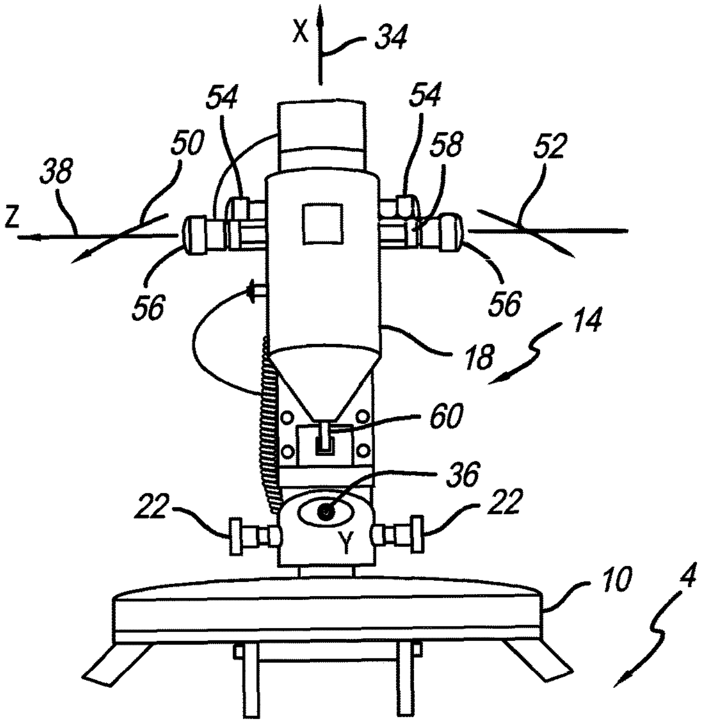
FIG. 4 is a front view of the lift arm assembly and instrument head portions of the percussive adjusting instrument.
Figure 5:
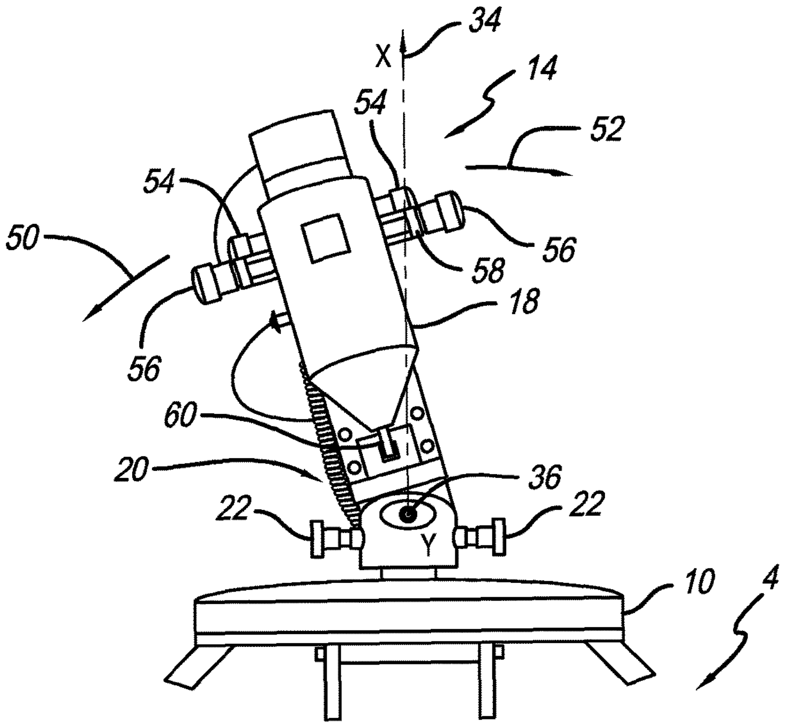
FIG. 5 is another front view of the percussive adjusting instrument with the lift arm assembly and instrument head portions pivoted about the Y-axis.
Figure 6:
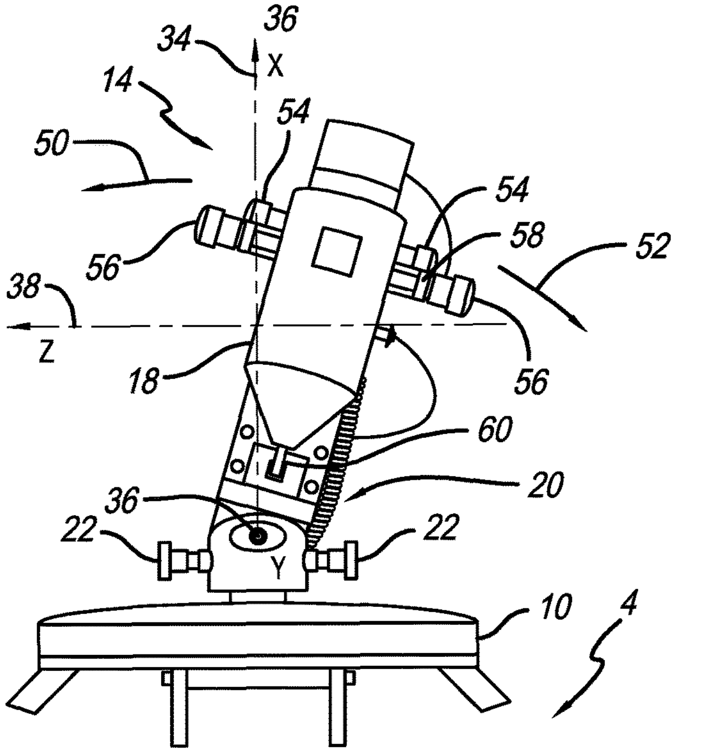
FIG. 6 is another front view of the percussive adjusting instrument with the lift arm assembly and instrument head portions pivoted about the Y-axis.

Front views of percussive adjusting instrument 2 looking down Y-axis 36 are shown in FIGS. 4, 5, and 6. The view in FIG. 4 depicts lift arm assembly 14 and instrument head 18 in a vertical orientation along X-axis 34. In this position, instrument head 18 does not move in either direction 50 or 52 relative to bed portion 4. This view further shows illustrative knobs 56, which selectively allows instrument head 18 to pivot about Z-axis 38. The skilled artisan will appreciate from this view and from FIG. 1, that instrument head 18 may be attached to a pivot bracket 58 where knobs 56 either provide a compressive force or other like holding mechanism to selectively secure instrument head 18 in a particular orientation relative to Z-axis 38. Likewise, knobs 54 on traversing arm bracket 57 (see also, FIG. 1) engages vertical ram arm 40 to selectively allow traversing arm 16 to move horizontally.

In the front view of FIG. 5, illustratively rotating Y-axis pivot control knob 22 causes lift arm assembly 14 to pivot in direction 50 about Y-axis 36. It is appreciated that traversing arm 16 and instrument head 18 pivots about Y-axis 36 with lift arm assembly 14. Here, instrument head 18 pivots at Y-axis pivot assembly 20 so instrument head 18 is not vertical along X-axis 34, but is instead pivoted about Y-axis 36 in relation to bed portion 4 (as well as headpiece 10). This directs instrument head 18 towards patient 44 from an orientation not previously achieved with prior art percussive adjusting instruments.

Figure 8:
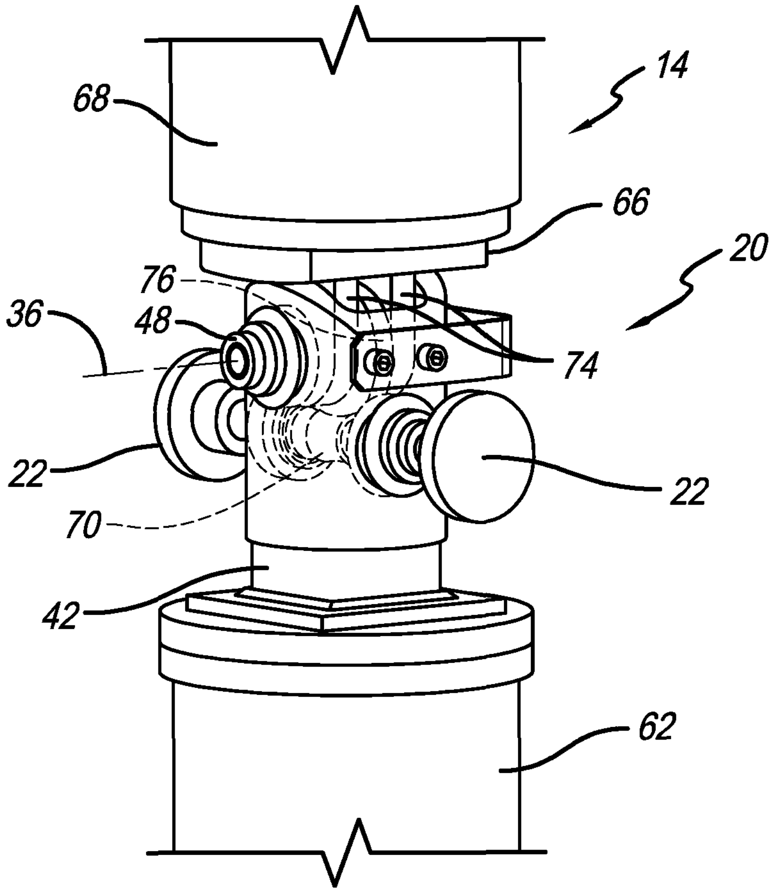
FIG. 8 is a perspective view of the Y-axis pivot assembly portion of the percussive adjusting instrument.
Figure 9:
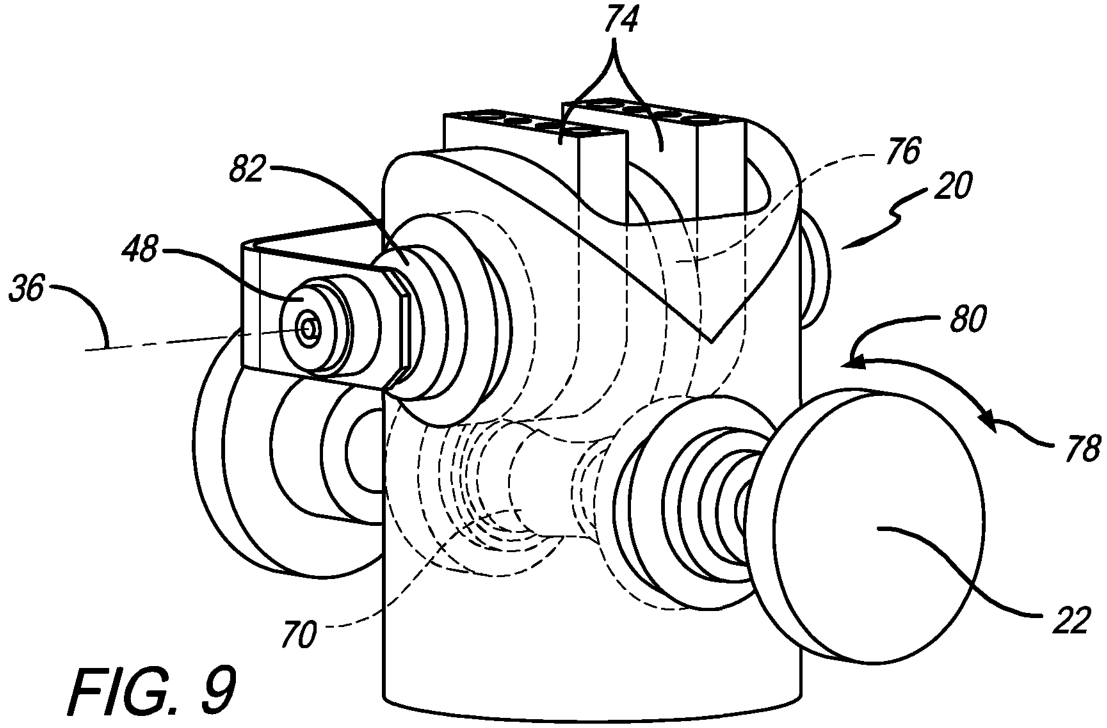
FIG. 9 is a perspective detail view of the Y-axis pivot assembly.

As further discussed herein, gears (see FIGS. 8 and 9) within Y-axis pivot assembly 20 move lift arm assembly 14 to a variety of pivoted positions about Y-axis 36 with instrument head 18 when Y-axis pivot control knob 22 is rotated in a first direction (see also, FIG. 9). The skilled artisan upon reading this disclosure will appreciate that in additional embodiments, lift arm assembly 14 may also be held at a pivoted angle about Y-axis 36 using mechanisms such as pins, fasteners, or other physical barriers (see also, FIGS. 11, 12, and 13). It is further appreciated in this view how patient 44 may be helped when instrument stylus 60 (see also, FIGS. 14, 15, and 17) is able to approach patient 44 from a different angle and particularly one about Y-axis 36, as opposed to just being limited to movement about X-axis 34 or Z-axis 38.

Rotating Y-axis pivot control knob 22 in illustratively an opposite direction (see also, FIG. 9), lift arm assembly 14 pivots about Y-axis 36 in an opposite direction 52 along with the traversing arm 16 and instrument head 18, as shown in FIG. 6. As will be appreciated from this view, pivoting about Y-axis 36, the instrument head's stylus 60 may be directed to another location on patient 44 to make appropriate chiropractic adjustments. It is also appreciated in this view that Y-axis pivot control knobs 22 may be located on each side of lift arm assembly 14, so the operator may tilt same when located on either side of bed portion 4. In alternate embodiments, Y-axis pivot control knobs 22, or other like adjusting structures capable of engaging and moving Y-axis pivot assembly 20 to selectively pivot lift arm assembly 14, may be used. Also shown is a Z-axis 38. It is appreciated that instrument head 18 may pivot about Z-axis 38 in positive and negative directions.

Figure 7:
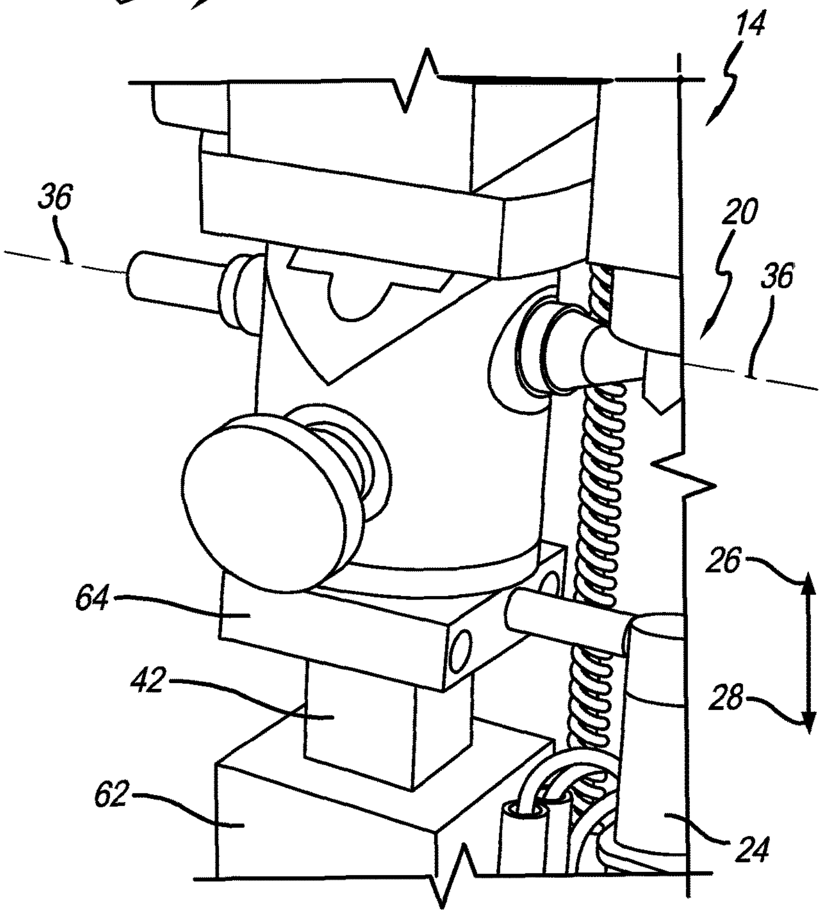
FIG. 7 is a detail perspective view of the Y-axis pivot assembly portion of the percussive adjusting instrument.

Multiple views of Y-axis pivot assembly 20 is shown in FIGS. 7, 8, and 9. The perspective view of Y-axis pivot assembly 20 shown in FIG. 7 demonstrates how it is mounted onto lift arm assembly 14. Particularly, Y-axis pivot assembly 20 is illustratively supported on vertical arm 42 telescopingly fitted within arm housing 62. In the illustrative embodiment, pivot lift actuator 24 is attached to both arm housing 62 and vertical arm 42, illustratively at base member 64, as shown. It is appreciated that pivot lift actuator 24 may be a hydraulically, liquid, air, solenoid or electrically driven actuator that moves vertically in either directions 26 or 28 to selectively raise or lower vertical arm 42 in the same directions. This results in Y-axis pivot assembly 20 to be selectively raised or lowered in directions 26 or 28 as well to provide vertical adjustment of the pivot location of lift arm assembly 14. Y-axis pivot control knobs 22 may be connected to each other and include a central gear, as further discussed with respect to FIGS. 8 and 9.

A perspective interior view of Y-axis pivot assembly 20, attached to vertical arm 42, and base 66 that attaches to base housing 68 of lift arm assembly 14, is shown in FIG. 8. This view depicts how Y-axis pivot assembly 20 pivots lift arm assembly 14. Y-axis pivot assembly 20 includes a central gear 70 disposed therethough. Y-axis pivot control knobs 22 are illustratively attached to central gear 70 so as Y-axis pivot control knobs 22 rotate, they rotate central gear 70. Illustratively, central gear 70 may be a worm screw portion of a worm gear assembly having fine tooth threading. This allows for fine pivoting adjustment of lift arm assembly 14 about Y-axis 36. Illustratively, the two Y-axis pivot control knobs 22 are movable to pivot lift arm assembly 14 such as about a tenth of a degree at a time, for example. It will be appreciated by the skilled artisan upon reading this disclosure that other such fine-moving gear or other mechanisms may be used to create fine micro-adjustments. Affixed to base 66 are spaced apart depending brackets 74. A pivot gear 76 may also be finely threaded and configured to engage the threading of central gear 70 to create a precise pivoting motion about Y-axis 36. Also shown is laser 48, illustratively oriented coincident with Y-axis 48.

Another perspective detail view of the interior of Y-axis pivot assembly 20 is shown in FIG. 9. This view is similar to FIG. 8 where, illustratively, rotating either Y-axis pivot control knobs 22 in either direction 78 or 80, causes central gear 70 to correspondingly rotate. Because of the fine tooth threading on central gear 70 engaging pivot gear 76, precise pivoting movements can be made. Pivot gear 76 is attached to depending brackets 74 as shown to hold same. An axis assembly 82 is illustratively disposed through pivot gear 76 sandwiched between depending brackets 74. Axis assembly 82 being coincident with Y-axis 36 assists pivoting pivot gear 76 and depending brackets 74 attached to base 66 to pivot lift arm assembly 14 about Y-axis 36. Illustratively, rotating either Y-axis pivot control knobs 22 rotates central gear 70 and moves pivot gear 76 in one direction or another to create the pivoting movement of lift arm assembly 14 as shown in FIGS. 5 and 6. In an illustrative embodiment pivot gear 76 may be a worm wheel that is part of a worm gear assembly. The worm wheel includes fine teeth threads that mesh with the worm screw threads of central gear 70. This view also shows laser 48 illustratively oriented coincident with Y-axis 48.

Figure 20:
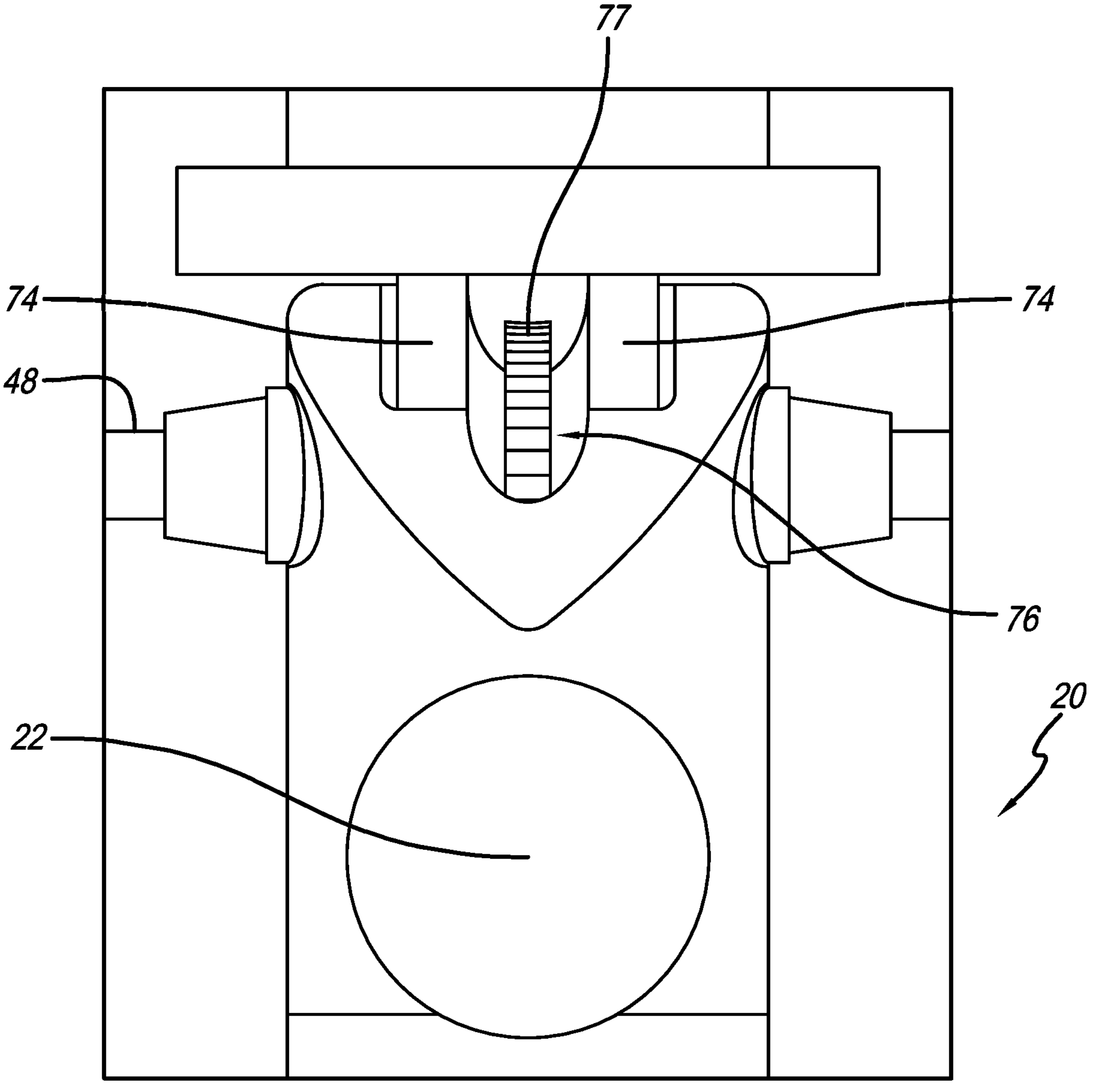
FIG. 20 is a perspective view of the Y-axis pivot assembly.

A perspective view of Y-axis pivot assembly 20 is shown in FIG. 20. This view shows illustrative threads 77 as previously discussed on pivot gear 76 between depending brackets 74. It will be appreciated by the skilled artisan reading this disclosure that the character of the threads on central gear 70 and pivot gear 76 may be designed in any configuration to achieve a desired pivot movement of lift arm assembly 14.

Figure 10:
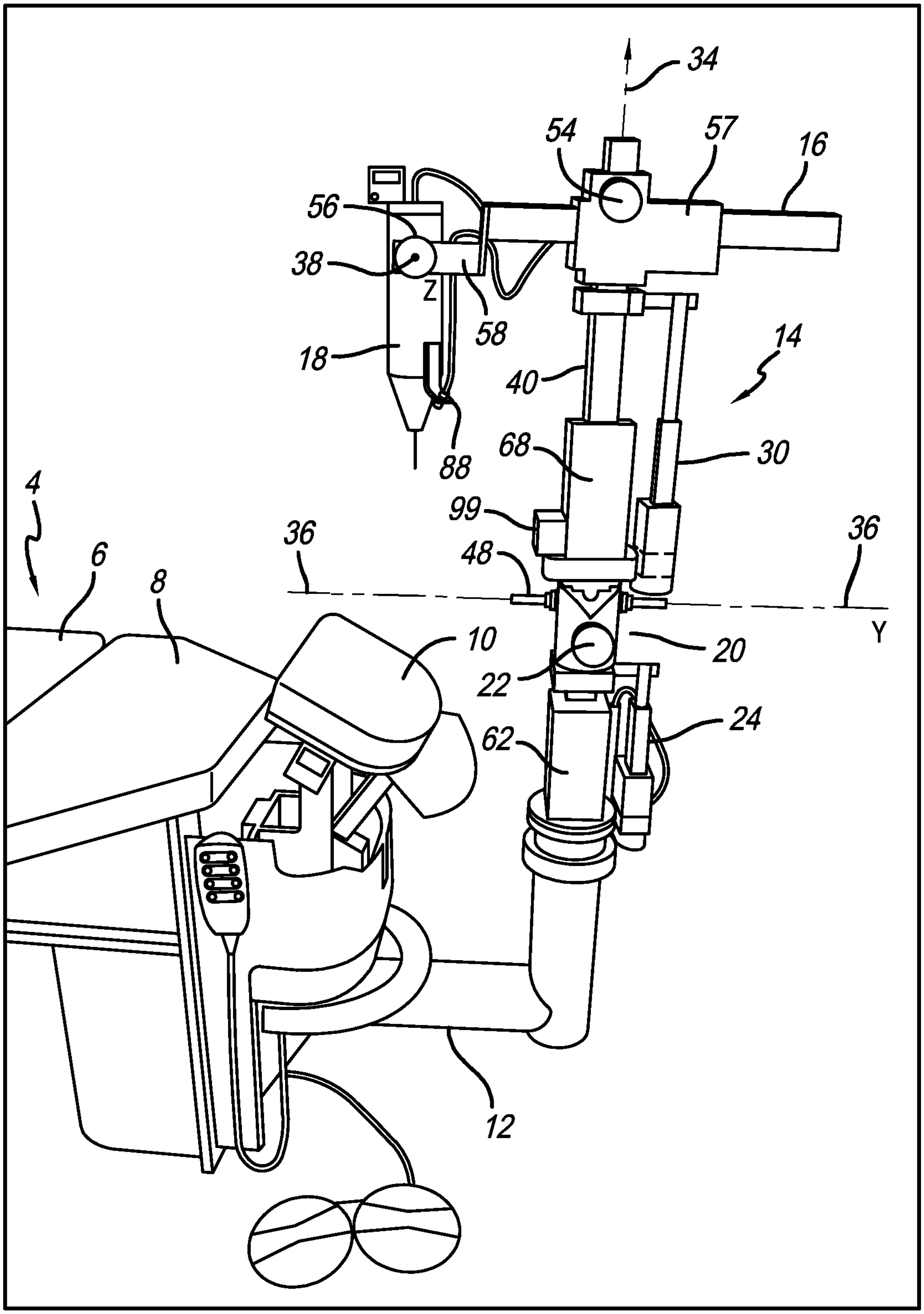
FIG. 10 is a side perspective view of the lift arm assembly portion of the percussive adjusting instrument.

Another side perspective view of lift arm assembly 14 from FIG. 1 is shown in FIG. 10. This view depicts separate pivot lift actuator 24 and instrument lift actuator 30 that are able to independently move portions of lift arm assembly 14 up or down in directions 26 or 28 along X-axis 34. Pivot lift actuator 24 and instrument lift actuator 30 move traversing arm 16 and instrument head 18 in directions 26 and 28 as well. It is appreciated from this view that vertical ram arm 40, which supports traversing arm 16 and instrument head 18, via traversing arm bracket 57 (see also, FIG. 1), is telescopingly movable up and down within base housing 68 by actuating instrument lift actuator 30. It is further appreciated that instrument head 18 may pivot on pivot bracket 58 about Z-axis 38 in positive and negative directions. Illustratively, pivot bracket 58 may be oriented vertically along an X-axis to offer instrument head 18 an even further range of movement in positive and negative directions.

Additionally, vertical ram arm 40 provides added stability to lift arm assembly 14 to support the weight of traversing arm 16 and instrument head 18, particularly when tilted about the Y-axis 36, as shown in FIGS. 5 and 6, for example. It is appreciated that vertical ram arm 40 may be made of aluminum and/or steel to support the load during movement. The illustratively square cross-section of the vertical ram arm 40 may also assist in counteracting any torsional or twisting loads that may be exerted when moving about Y-axis 36. Still further, the outer surface of the vertical ram arm 40 may be made of a low friction or friction mitigating material, such as nylon, polytetrafluoroethylene, or other nonstick or lubricating materials, to ensure proper vertical movement with the assistance of instrument lift actuator 30.

Also shown in FIG. 10 is headpiece 10 that is movable along X-axis 34 and about Z-axis 38. Illustratively, both headpiece 10 and instrument head 18 are movable simultaneously along X-axis 34 in directions 26 and 28 to limit any potential risk of instrument stylus 60 coming into contact with patient 44. In additional embodiments, instrument stylus 60 may be retractable or have a break-away feature to prevent instrument stylus 60 from causing injury to patient 44 if unintentional contact occurs between patient 44 and the instrument stylus 60. In yet a further embodiment, a solenoid impact to stylus 60 may be initiated by an electromagnetic impulse generator to allow for a more consistent strike to occur.

Figure 11:
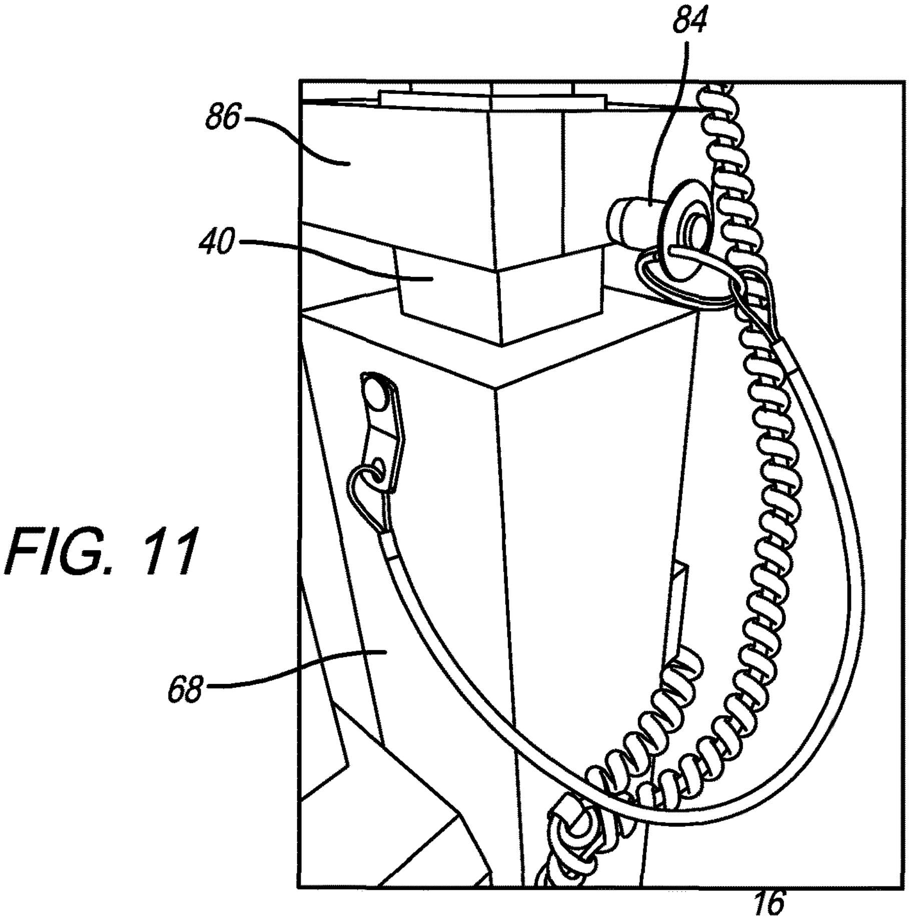
FIG. 11 is a detail perspective view of a portion of the lift arm assembly of the percussive adjusting instrument.
Figure 12:
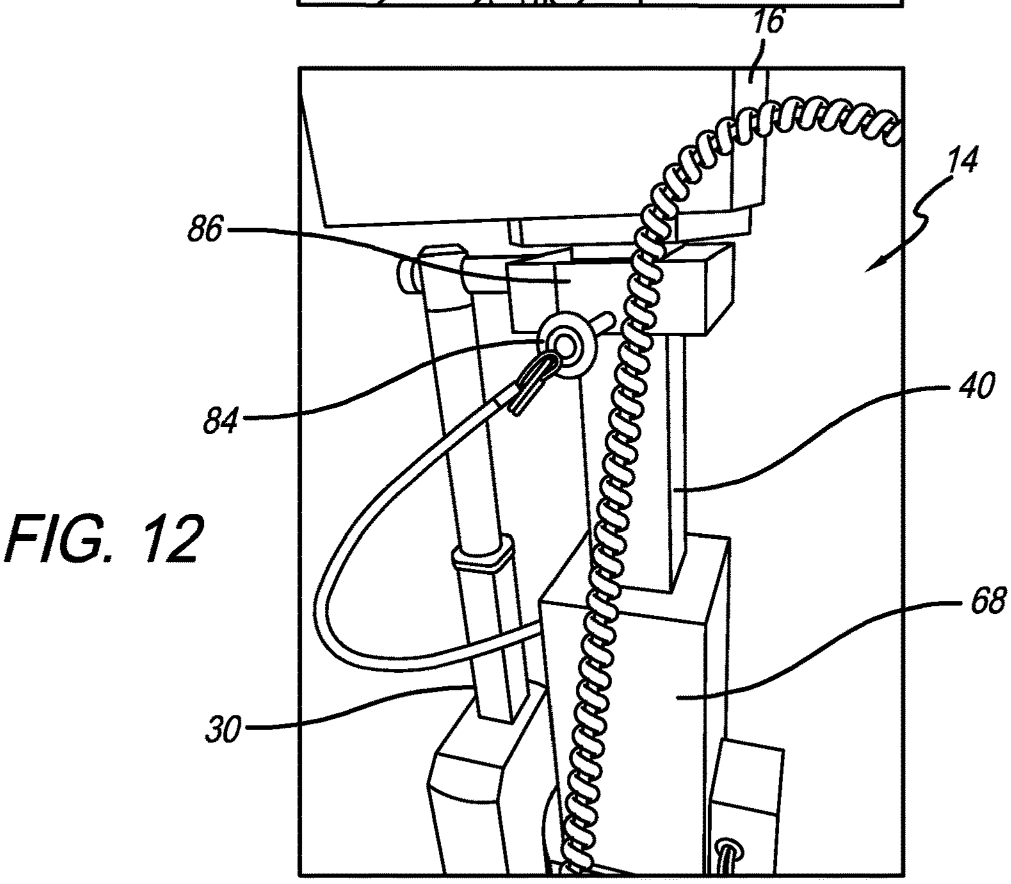
FIG. 12 is another perspective view of the lift arm assembly of the percussive adjusting instrument.
Figure 13:
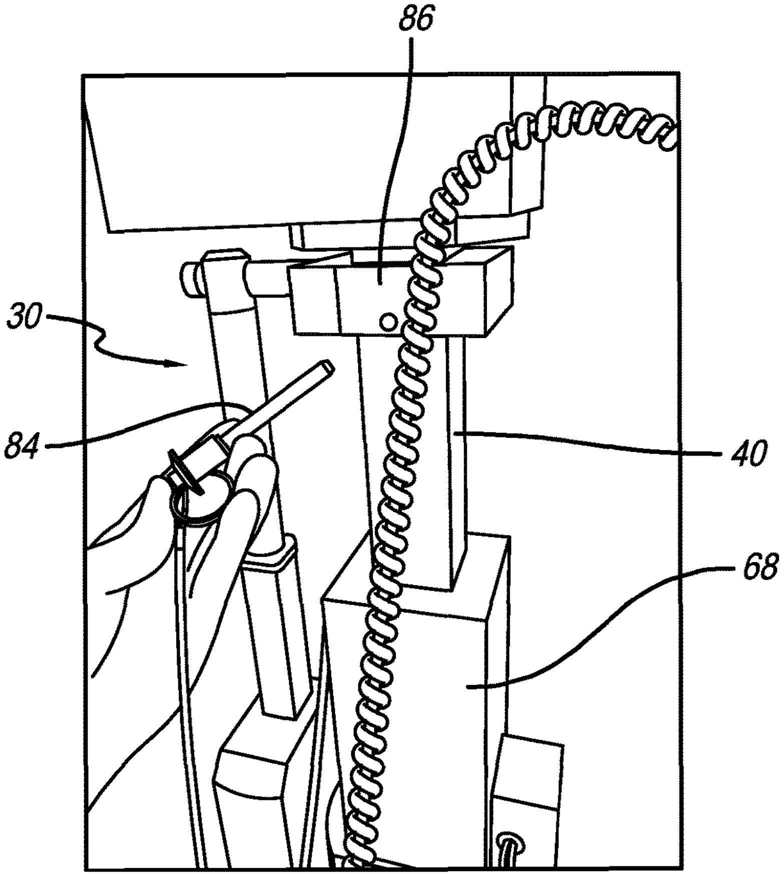
FIG. 13 is another perspective view of the lift arm assembly of the percussive adjusting instrument.

Detailed perspective views of lift arm assembly 14 are shown in FIGS. 11, 12, and 13, depicting a locking pin 84 that is illustratively disposed through bracket 86 and engages instrument lift actuator 30 and vertical ram arm 40. Locking pin 84 is set in place before vertical ram arm 40 is pivoted about Y-axis 36 to a needed location. This prevents traversing arm 16 and instrument head 18 from moving while positioning lift arm assembly 14 about Y-axis 36. In other words, pin 84 prevents instrument head 18 from swinging down due to gravity once lift arm assembly 14 moves. Traversing arm 16 pivots with lift arm assembly 14 as shown in FIGS. 5 and 6. Furthermore, traversing arm 16 is moved out of the way so patient 44 may lie down on bed portion, and then sit back up without interference from instrument head 18. This, however, may also predispose lift arm assembly 14 to be overtaken by gravity when tilted essentially toward the floor (i.e., rotated about Y-axis 36). Locking pin 84 may, therefore, provide additional stability to lift arm assembly 14 in such circumstance.

A further embodiment of the present disclosure provides laser-guided alignment features for lift arm assembly 14 and instrument head 18. As shown in the perspective views of FIGS. 14, 15, and 16, a laser may be projected onto patient 44 to allow the operator to determine proper positioning. Particularly, Y-axis laser 48 and a stylus aiming laser 88 help position patient 44 and aim stylus 60. Y-axis laser 48 on Y-axis pivot assembly 20 is used for positioning the Y pivot about the center of the patient's head (see also, FIGS. 3 and 14). Stylus aiming laser 88 is located on instrument head 18. Stylus aiming laser 88 is for both positioning the head of patient 44 on headpiece 10 as well as positioning stylus 60 on the head.

Figure 14:
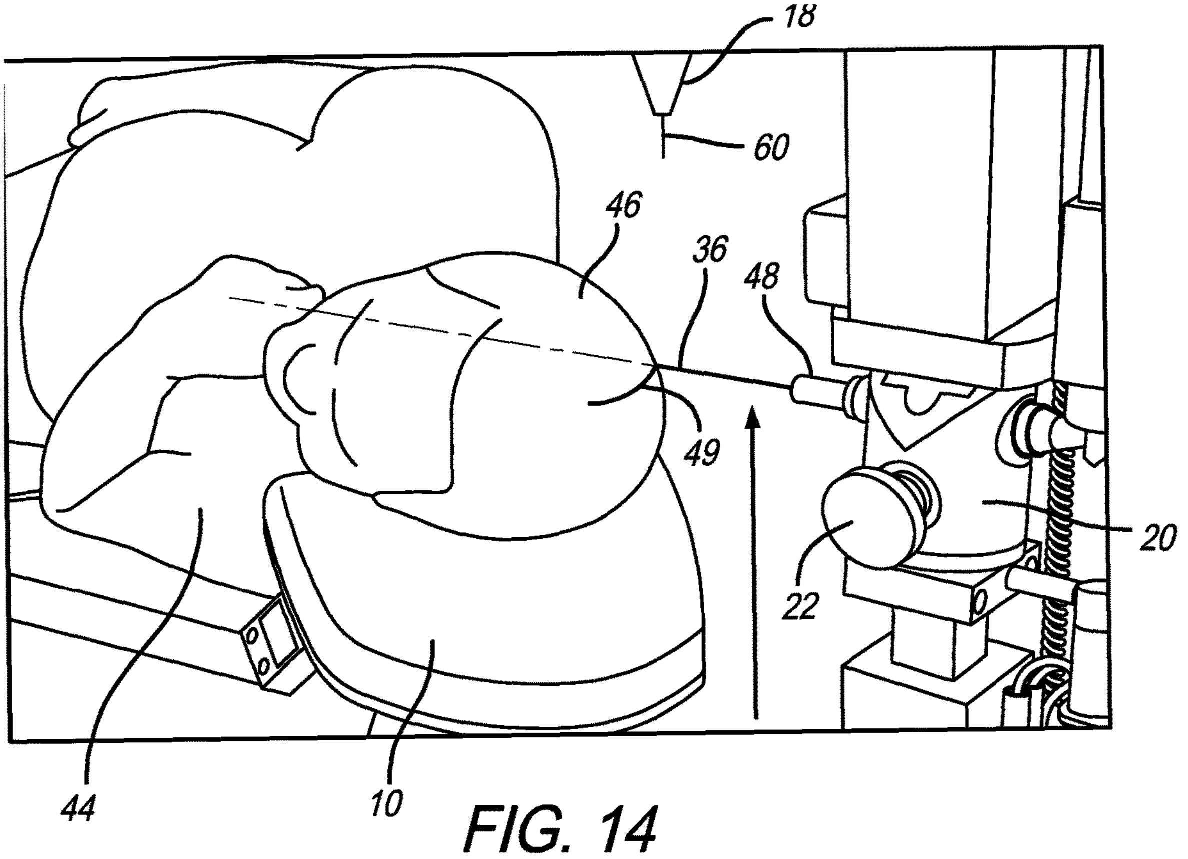
FIG. 14 is a perspective detail view of a portion of the percussive adjusting instrument.
Figure 15:
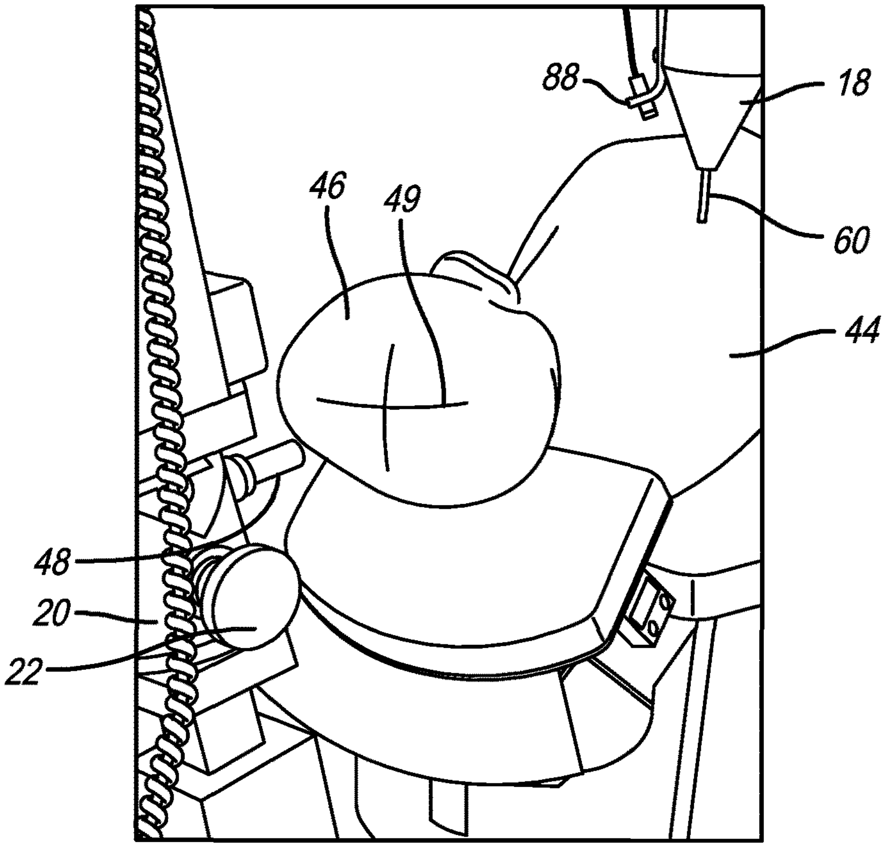
FIG. 15 is another detail view of the portion of the percussive adjusting instrument and Y-axis laser for aligning the patient.
Figure 16:
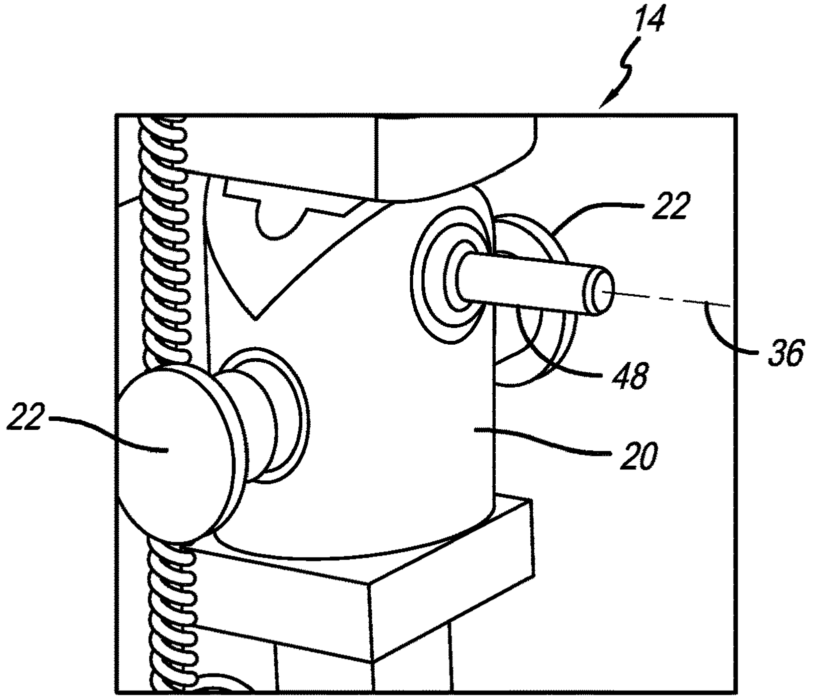
FIG. 16 is another detail view of the Y-axis pivot assembly.

As shown in the perspective views of FIGS. 14 and 15, Y-axis laser 48 may be projected onto patient 44 along Y-axis 36 to allow an operator to determine proper positioning of patient 44 with respect to instrument head 18. As shown in FIGS. 14 and 15, Y-axis laser 48 projects light 49 onto head 46 of patient 44 so that instrument head 18 will be in the proper position to aim instrument stylus 60 and position head 46 of patient 44 properly on headpiece 10. The perspective view of Y pivot assembly 20 is shown in FIG. 16. This view depicts Y-axis laser 48 is illustratively configured to project a beam of light 49 along the Y-axis (see also, FIG. 3).

Figure 17:
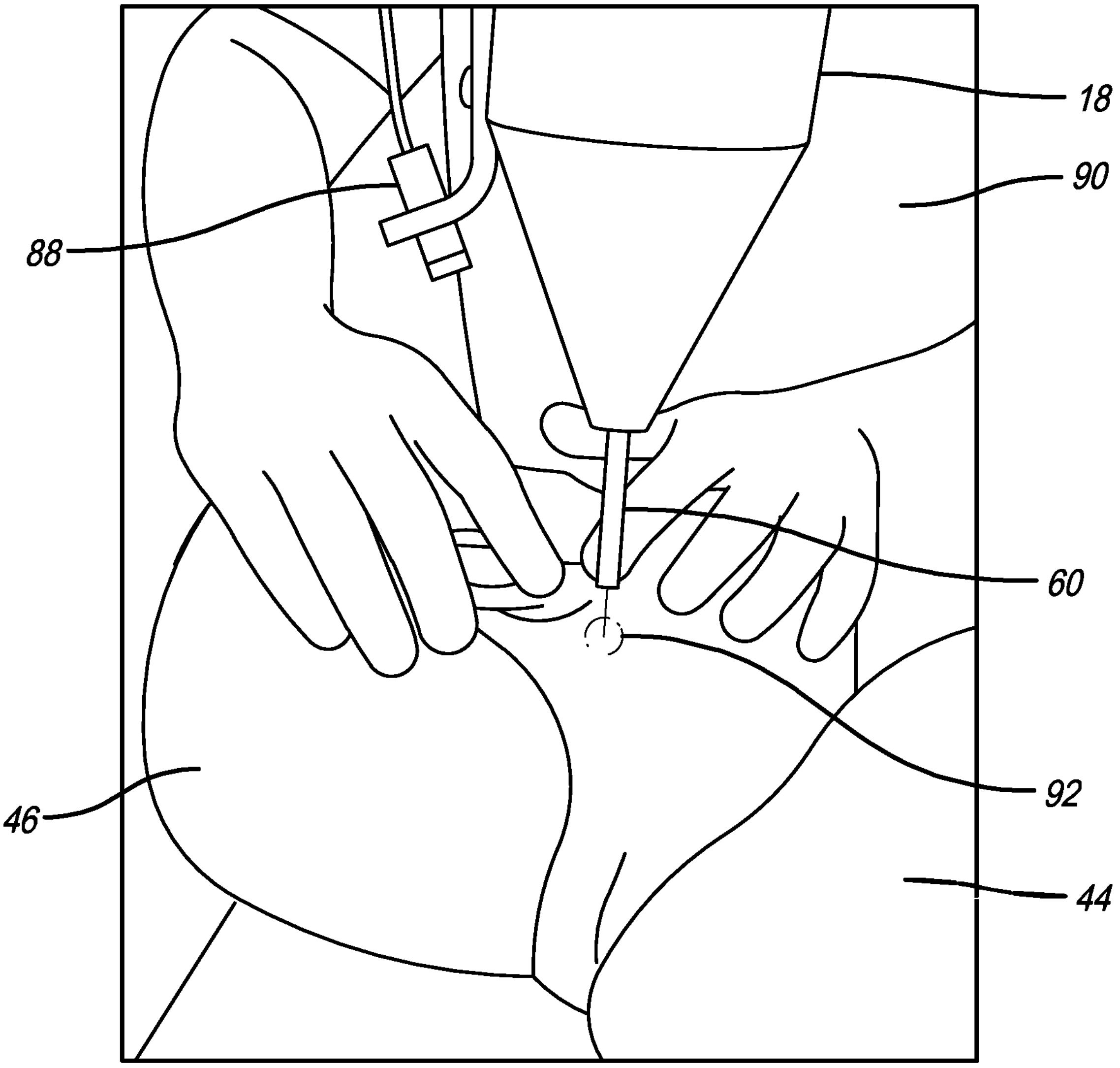
FIG. 17 is a perspective detail view of the instrument head portion of the percussive adjusting instrument that includes a stylus and patient positioning laser.

A perspective view of instrument head 18, with stylus aiming laser 88 attached thereon, is shown in FIG. 17. Stylus aiming laser 88 allows an operator 90 to aim instrument head 18 to a desired location. It is appreciated that projected image 92 of stylus aiming laser 88 may include, but is not limited to, a single dot, cross-hair, or other configuration. Stylus aiming laser 88 is also used for positioning the patient's head on headpiece 10. This is to add accuracy of patient head positioning on headpiece 10 as well as to replace the need for using an additional tool such as a "laser template". The current tool/template is used after the patient is positioned to measure their position on the headpiece. Using laser 88 allows the crosshair laser to be used to actually position the patient. Additionally, the positioning and/or configuration of lasers 48 and 88 from FIGS. 16 and 17 may be adjusted for aesthetic and/or functional purposes.

Figure 18:
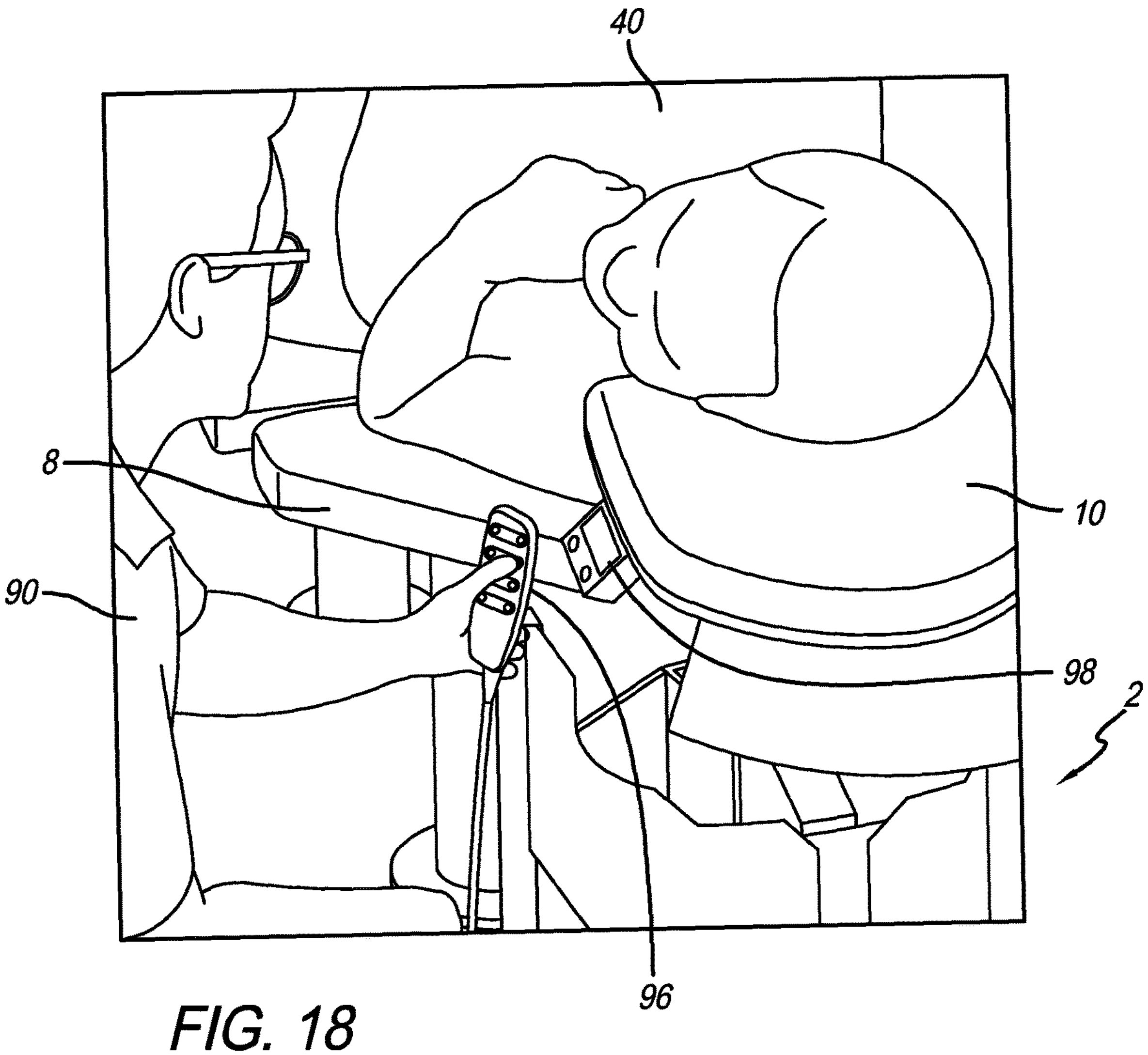
FIG. 18 is a perspective view of the portion of the percussive adjusting instrument.
Figure 19:
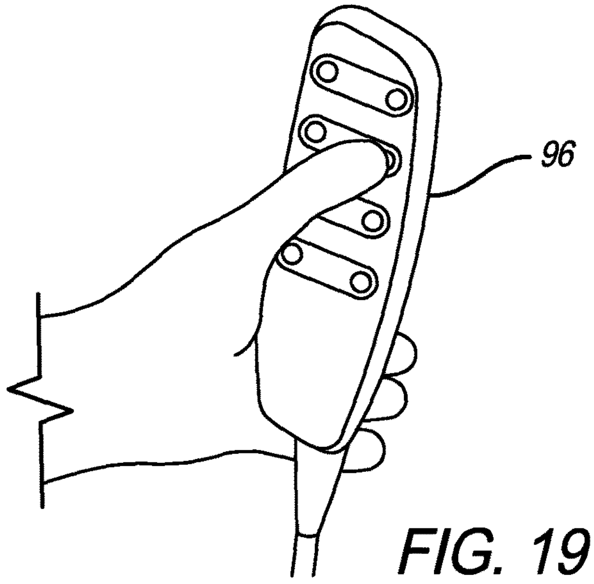
FIG. 19 as a perspective view of the remote-control portion of the percussive adjusting instrument.

An additional illustrative embodiment of the present disclosure includes a remote control 96 that may operate various features of percussive adjusting instrument 2. Motors (not shown) for shoulder piece 8 and headpiece 10 movements may be controlled by hand-held remote control 96. The illustrative embodiment shown in FIGS. 18 and 19 include a push button remote control 96 that is hardwired to percussive adjusting instrument 2. It will be appreciated by a skilled artisan upon reading this disclosure that remote control 96 may alternatively be wireless—operating via IR, FR transmitting, Bluetooth, or Wi-Fi transmitting as well. Illustratively, remote control 96 may include two buttons per movement for the shoulder piece superior/inferior movement, shoulder piece anterior/posterior movement, headrest elevation, and headrest tilt, for example. In further embodiments, percussive adjusting instrument 2 may include a feature that allows for tilting the support armature at the base of the instrument at an angle to match a patient's side-lying cervical center line reference point, as well as a track to slide the armature rather than pivoting around the X-axis.

In a further illustrative embodiment, percussive adjusting instrument 2 may include a digital readout panel 98 (see also, FIG. 18) to allow operator 90 to read the particular status of percussive adjusting instrument 2. Y-axis 36 and Z-axis 38 instrument settings may be displayed through digital readout panel 98 that may be viewed from either side of instrument 2.

In a further illustrative embodiment, encoder sensors or inclinometers may be used at a plurality of locations on percussive adjusting instrument 2 to send feedback to a digital readout display panel about a structure's angle. For example, an inclinometer may be placed in the headpiece 10 to determine the orientation of that structure. Additional inclinometers may be located at the X-axis 34 at the pivot point of connecting arm 12, Y-axis at Y-axis pivot assembly 20, and Z-axis at one of the knobs 56, for example. Further additional inclinometers may be located at instrument head 18 on its own Z-axis pivot, Y-axis pivot assembly 20, lift arm assembly 14, connecting arm 12, and other such structures to individually determine the orientation of those structures as well. Headpiece 10, vertical lift arm assembly 14, body support 6, shoulder piece 8, traversing arm 16, instrument head 18, and other movable components may include inclinometers to determine their angles with respect to gravity. Data from the inclinometers may communicate information to the above digital display readout panel 98 or other display screen(s) (e.g., LCD or LED panels) to be read. A display panel 99 may also be placed at any other convenient location including adjacent the Y-axis pivot assembly 20 as shown in FIGS. 1, 3, and 10. This allows display panel 99 to be seen from either side of bed portion 4. It is appreciated that the inclinometers may communicate with display panel 99 via wires, Bluetooth, or wifi. It is further appreciated that any of the systems on this instrument may be operated through computer assistance.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. To the extent any subject matter disclosed in this non-provisional patent application differs from or is perceived as in conflict with the priority application, the disclosure in this non-provisional patent application controls, supersedes, and replaces the disclosure of the priority application.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A percussive adjusting instrument comprising:
- a percussive instrument head; and
- a lift arm that supports the percussive instrument head;
- wherein the percussive instrument head is movable with respect to the lift arm about a Z-axis of a Cartesian coordinate system;
- wherein the lift arm is selectively movable vertically in an X-axis of the Cartesian coordinate system to move the percussive instrument head vertically in the X-axis;
- wherein the lift arm is selectively movable about a Y-axis of the Cartesian coordinate system to move the percussive instrument head about the Y-axis; and
- further comprising a pivot assembly that allows movement of the lift arm and the percussive instrument head about the Y-axis, wherein the pivot assembly includes a Y-axis laser.

2. The percussive adjusting instrument of claim 1, wherein the lift arm includes a first support arm element and a second arm element wherein the second arm element is co-axially movable with respect to the first support arm element.

3. The percussive adjusting instrument of claim 1, wherein the lift arm includes a first support arm element and a second arm element wherein the second arm element is movable about the Y-axis with respect to the first support arm element.

4. The percussive adjusting instrument of claim 1, further comprising a traversing arm that couples to the percussive instrument head and to the lift arm, wherein the percussive instrument head is movable with respect to the traversing arm, and wherein the lift arm supports the traversing arm.

5. The percussive adjusting instrument of claim 1, wherein the pivot assembly includes a central gear and a pivot gear, wherein rotation of the central gear engages the pivot gear which moves at least a portion of the lift arm.

6. The percussive adjusting instrument of claim 5, wherein the central gear is a worm screw.

7. The percussive adjusting instrument of claim 6, wherein the pivot gear is a worm wheel located on a separate axis from the worm screw, wherein the worm wheel is coupled to at least a portion of the lift arm.

8. The percussive adjusting instrument of claim 1, wherein the Y-axis laser is oriented coincident with the Y-axis.

9. The percussive adjusting instrument of claim 1, wherein the percussive instrument head includes a stylus aiming laser.

10. The percussive adjusting instrument of claim 1, wherein the percussive instrument head includes a stylus aiming laser.

11. A percussive adjusting instrument comprising:

a percussive instrument head;

a lift arm;

wherein the lift arm includes a first arm segment and a second arm segment;

wherein the second arm segment of the lift arm supports the percussive instrument head;

wherein the percussive instrument head is movable with respect to the second arm segment of the lift arm about a Z-axis of a Cartesian coordinate system;

wherein the second arm segment is extendable with respect to the first arm segment in an X-axis of the Cartesian coordinate system to move the percussive instrument head in the X-axis;

wherein the second arm segment of the of the lift arm is selectively movable about a Y-axis of the Cartesian coordinate system to move the percussive instrument head about the Y-axis; and further comprising a pivot assembly that allows movement of the second arm segment of the lift arm and the percussive instrument head about the Y-axis, wherein the pivot assembly includes a Y-axis laser.

12. The percussive adjusting instrument of claim 11, further comprising a lift actuator that moves the second arm segment with respect to the first arm segment.

13. A percussive adjusting instrument comprising:

a bed portion;

a percussive instrument head; and a vertical arm that supports the percussive instrument head;

wherein the vertical arm is coupled to the bed portion;

wherein the percussive instrument head is movable about a first axis with respect to the vertical arm;

wherein at least a second portion of the vertical support arm is movable about a second axis that is transverse to a longitudinal extent of at least a first portion of the vertical arm and transverse to the first axis about which the percussive instrument head is movable with respect to the vertical arm; and further comprising a pivot assembly that allows movement of the vertical arm and the percussive instrument head about the second axis, wherein the second axis is a Y-axis with respect to the first axis which is a Z-axis, and wherein the pivot assembly includes a Y-axis laser directed over the bed portion.

14. The percussive adjusting instrument of claim 13, wherein the Y-axis laser is oriented coincident with the Y-axis.

* * * * *